Aug. 15, 1950  J. J. KELLEHER  2,518,899
TRICYCLE TYPE ROCKING HORSE
Filed Aug. 2, 1948  2 Sheets-Sheet 1

Jeremiah J. Kelleher
INVENTOR.

BY *Clarence A. O'Brien*
*and Harvey B. Jacobson*
Attorneys

Aug. 15, 1950     J. J. KELLEHER     2,518,899
TRICYCLE TYPE ROCKING HORSE
Filed Aug. 2, 1948     2 Sheets-Sheet 2

Jeremiah J. Kelleher
INVENTOR.

Patented Aug. 15, 1950

2,518,899

UNITED STATES PATENT OFFICE 2,518,899

TRICYCLE TYPE ROCKING HORSE

Jeremiah J. Kelleher, Dubuque, Iowa

Application August 2, 1948, Serial No. 41,971

3 Claims. (Cl. 280—1.195)

My invention relates to improvements in rocking horses of the tricycle pedal operated type.

The primary object of the invention is to provide a rocking horse on a tricycle carriage and for steering of the carriage by swinging of a front section of the body of the horse while the body is rocking and without opposing any appreciable resistance to rocking movement of the body, all to the end that the horse will appear to be headed in the direction in which it is being steered instead of straight ahead while being turned as is the case in similar devices as commonly constructed.

Another object is to simplify such devices, reduce the cost of manufacture thereof, and provide a strong device which is safe for children.

Other and subordinate objects, within the purview of my invention, together with the precise nature of my improvements will be readily understood when the suceeding description and claims are read with reference to the drawings accompanying and forming part of this specification.

In said drawings—

Figure 1:
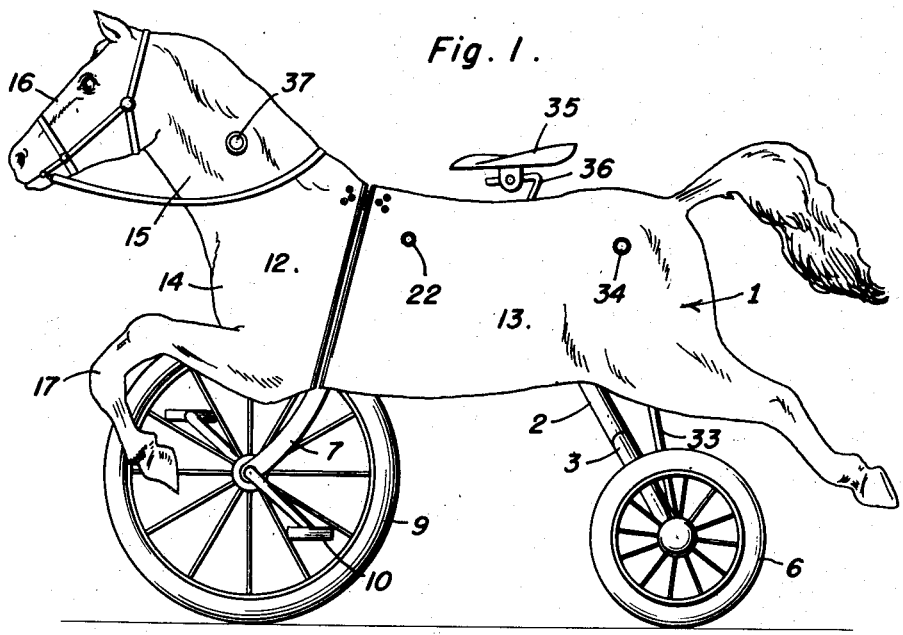
Figure 1 is a view in side elevation of my improved rocking horse in the preferred embodiment thereof.
Figure 2:
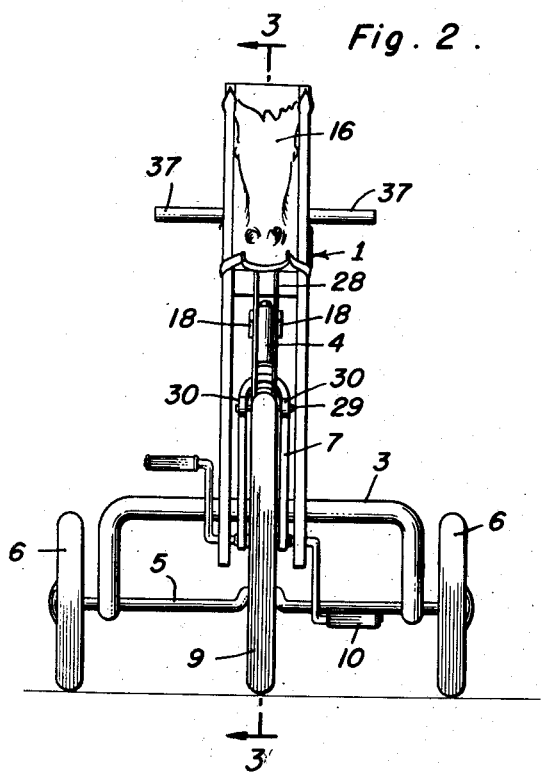
Figure 2 is a view in front elevation.
Figure 7:
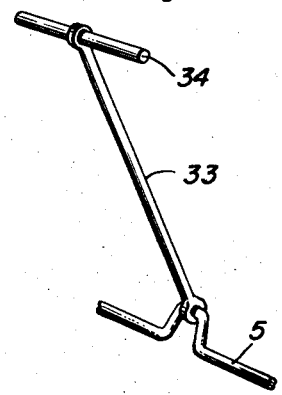
Figure 7 is a fragmentary view in perspective of the rear crank shaft and the pitman.
Figure 3:
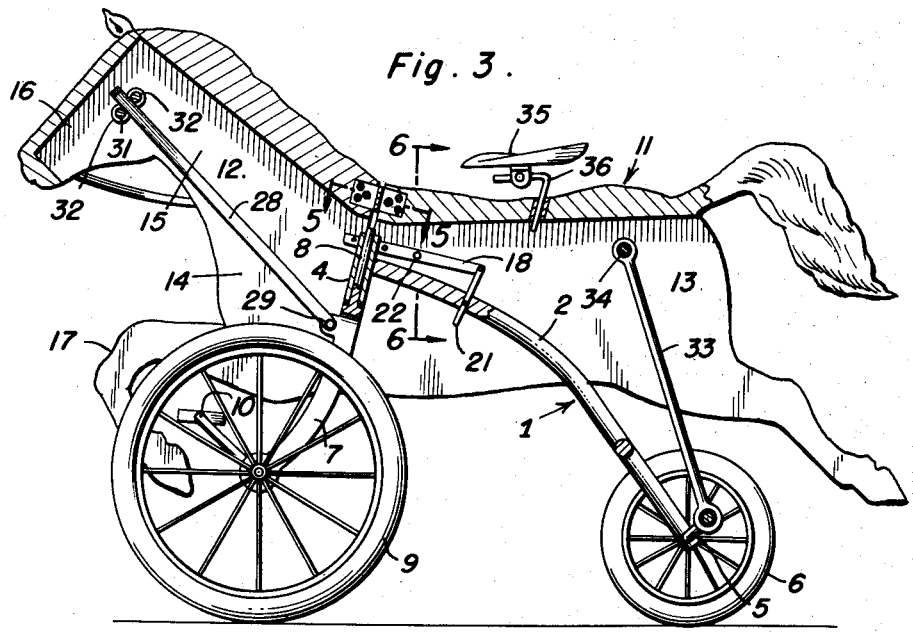
Figure 3 is a view in vertical longitudinal section taken on the line 3—3 of Figure 2.
Figure 4:
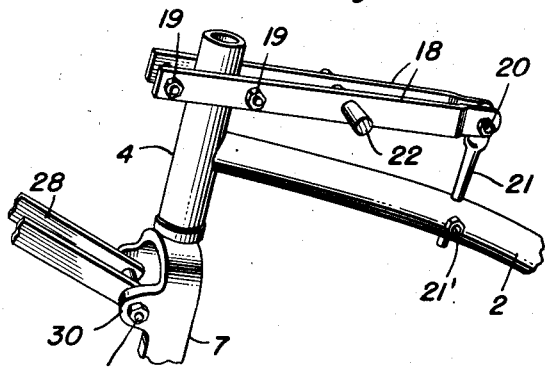
Figure 4 is a fragmentary view in perspective of the carriage and the mounting for the body of the horse, drawn to a larger scale.
Figure 5:
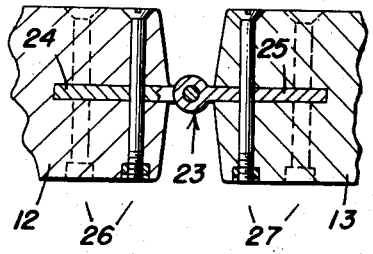
Figure 5 is a fragmentary view in horizontal section taken on the line 5—5 of Figure 3 and drawn to a larger scale.
Figure 6:
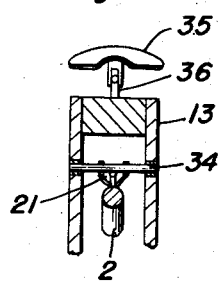
Figure 6 is a fragmentary view in vertical transverse section taken on the line 6—6 of Figure 3.

Referring to the drawings by numerals, my improved rocking horse as illustrated comprises a carriage frame 1 including the usual downwardly and rearwardly extending frame bar 2 with a forked rear end 3 and an upright front end bearing sleeve 4. A crank shaft 5 is journalled in said rear end 3 with rear ground wheels 6 on the ends thereof, one fast on said shaft to drive said shaft. A front steering wheel fork 7 has the usual upper end post 8 journalled in the bearing sleeve 4. The usual large steering and propelling wheel 9 is mounted in the steering wheel fork 7 for driving by the usual pedals 10.

According to my invention, a hollow body 11 of a galloping horse is provided which opens downwardly and straddles the described frame 1 above the rear end 3 and also straddles the steering and propelling wheel 9. The body 11 is split vertically at the shoulders of the same to divide said body into a front section 12 and a rear section 13, the front section 12 including the chest 14, neck 15, head 16 and front legs 17 of said body.

The rear section 13 of the body 11 is mounted on the frame 1 for vertical rocking movement as follows: A pair of side by side body supporting bars 18 are adjustably clamped by bolts 19 at front ends thereof to opposite sides of the bearing sleeve 4 to extend rearwardly from said sleeve over the frame bar 2 and having the rear ends thereof bolted, as at 20 to opposite sides of an upstanding post 21 slidably extending through said bar 2 for vertical adjustment into different set positions as determined by a set bolt 21' in said bar 2. A transverse rod 22 extends through the bars 18 intermediate the ends thereof and is journalled in the sides of said section 13. As will be seen, the section 13 straddles the described mounting therefor and is arranged to rock vertically on the rod 22. By adjusting the bars 18 vertically on the bearing sleeve 4 and similarly adjusting the post 21 in the frame bar 2 the height of the section 13 of the body 11 may be adjusted, as required.

The front section 12 of the body 11 is hinged to the rear section 13 to swing laterally thereon while being locked vertically thereby. For this purpose, said sections 12, 13 are connected together by a hinge 23 directly above the post 8 with the axis of the hinge vertically aligned with the axis of said post and leaves 24, 25 of said hinge 23 set into confronting edges of the sections 12, 13 and secured therein by bolts 26, 27.

Steering connections are provided between the section 12 of the body 11 and the steering wheel fork 7 for turning said fork in steering by lateral swinging of said section 12 in the direction in which it is desired to steer the steering and propelling wheel 9. The steering connections comprise a U-shaped bar 28 in said section 12 inclining downwardly and rearwardly from the head 16 to the steering wheel fork 7. The bar 28 is vertically swingable on a bolt 29 extending through the rear end of the bar horizontally and through a pair of ears 30 on the front of the steering wheel fork 7 directly above the steering and propelling wheel 9. The opposite end of the bar 28 is slidably interposed between a pair of cross rods 31 in the head 16 so that said bar 28 is endwise slidable between said rods and vertically swingable on the bolt 29 to compensate for vertical swinging of the section 12 during rocking of the body 11. Shoulders 32 on the rods 31 upon opposite sides of the bar 28 provide for lateral swinging of said bar 28 by lateral swinging of the section 12.

A pitman rod 33 extends from the crank shaft 5 up into the section 13 at the rear end thereof and is pivoted on a cross rod 34 in said section 13 so that as said shaft is revolved, the section 13 and hence the body 11 will be rocked vertically.

A seat 35 is provided on the section 13 on a seat post 36 suitably secured in said section 13.

A pair of handle bars 37 extend outwardly from the neck 14 of the section 12 for grasping by a child occupying the seat 35 and whereby the section 12 may be swung laterally for steering purposes.

As will be manifest, by swinging of the section 12 on the body 11 from side to side, the bar 28 may be correspondingly swung to turn the steering wheel fork 7 and the steering and propelling wheel 9 for steering purposes and said bar will swing vertically and slide endwise between the rods 31 to compensate for vertical rocking of the section 12 while the section 13 is being rocked by the pitman rod 13 and crank shaft 5. Because of the manner in which the bar 28 is pivoted and slidably mounted, resistance to vertical rocking of the section 12 and hence of the body 11 is negligible.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In a rocking horse, a tricycle carriage including a frame and a front steering wheel fork rotatable in said frame for steering, a hollow downward opening horse body straddling said frame and fork and vertically divided at the juncture of the neck of the horse with the remainder of the body into front and rear sections, means to mount said body on said frame for vertical rocking movement, means hingedly connecting said sections together for swinging of the front section on the rear section, and means for rotating said steering fork by such swinging of said front section comprising a U-shaped bar in said front section having one end pivotally connected to opposite sides of said steering fork and its other end slidably mounted in said front section.

2. In a rocking horse, a tricycle carriage including a frame and a front steering wheel fork supporting the frame, a hollow downwardly opening horse body vertically divided into front and rear sections straddling said frame and wheel fork, the rear section being pivotally mounted on said frame for vertical rocking movement and the front section being hinged to the rear section for rocking therewith and lateral swinging thereon, and means for steering said wheel by lateral swinging of said front section during rocking of said sections, including a bar in said front section pivoted to said fork and slidably mounted in said front section for vertical swinging to compensate for rocking of said body relative to said fork.

3. In a rocking horse a wheeled carriage including a front rotatable steering wheel fork, a horse body, means to mount said body on said carriage for vertical rocking movement, said body being vertically divided into front and rear sections, said front section including the neck and head of the horse, means hingedly connecting said sections together for lateral swinging of the front section on the rear section in the axis of rotation of said fork, and means for rotating said fork by lateral swinging of said front section comprising a bar pivoted to said fork and extending in said front section into said head, and a slidable connection in said head between the head and said bar.

JEREMIAH J. KELLEHER.

REFERENCES CITED

The following references are of record in the file of this patent:

UNITED STATES PATENTS

| Number | Name | Date |
| --- | --- | --- |
| 1,088,185 | Swender | Feb. 24, 1914 |
| 1,457,205 | Baker | May 29, 1923 |
| 1,795,678 | Raphael | Mar. 10, 1931 |
| 2,212,781 | La Bille | Aug. 27, 1940 |
| 2,344,062 | Rinehart | Mar. 14, 1944 |
| 2,501,531 | McMellon | Mar. 21, 1950 |